US008059876B2

(12) United States Patent
Masumoto et al.

(10) Patent No.: US 8,059,876 B2
(45) Date of Patent: Nov. 15, 2011

(54) CARDIAC FUNCTION ANALYSIS APPARATUS, METHOD AND PROGRAM

(75) Inventors: Jun Masumoto, Ichikawa (JP); Masaki Miyamoto, Tokyo (JP)

(73) Assignee: Fujifilm Corporation, Tokyo (JP)

( * ) Notice: Subject to any disclaimer, the term of this patent is extended or adjusted under 35 U.S.C. 154(b) by 650 days.

(21) Appl. No.: 12/127,687

(22) Filed: May 27, 2008

(65) Prior Publication Data

US 2008/0312527 A1    Dec. 18, 2008

(30) Foreign Application Priority Data

May 28, 2007   (JP) ................. 2007-140851

(51) Int. Cl.
*G06K 9/00* (2006.01)
(52) U.S. Cl. ......... 382/128; 382/130; 382/131; 600/437
(58) Field of Classification Search .......... 600/407–410, 600/437–463; 382/128–131
See application file for complete search history.

(56) References Cited

U.S. PATENT DOCUMENTS

| | | | | |
|---|---|---|---|---|
| 5,435,310 | A * | 7/1995 | Sheehan et al. | 600/416 |
| 5,515,856 | A * | 5/1996 | Olstad et al. | 600/440 |
| 6,187,032 | B1 * | 2/2001 | Ohyu et al. | 600/409 |
| RE37,088 | E * | 3/2001 | Olstad et al. | 600/440 |
| 6,447,454 | B1 * | 9/2002 | Chenal et al. | 600/449 |
| 7,043,063 | B1 * | 5/2006 | Noble et al. | 382/128 |
| 2002/0072672 | A1 * | 6/2002 | Roundhill et al. | 600/450 |
| 2002/0072674 | A1 * | 6/2002 | Criton et al. | 600/454 |
| 2003/0171668 | A1 * | 9/2003 | Tsujino et al. | 600/407 |
| 2005/0008209 | A1 | 1/2005 | Matsumoto | |
| 2006/0122512 | A1 * | 6/2006 | Abe | 600/454 |
| 2009/0136109 | A1 * | 5/2009 | Salgo et al. | 382/131 |
| 2009/0161938 | A1 * | 6/2009 | Shekhar et al. | 382/131 |
| 2009/0219301 | A1 | 9/2009 | Gerard et al. | |

FOREIGN PATENT DOCUMENTS

| | | |
|---|---|---|
| JP | 2791255 B2 | 8/1998 |
| JP | 2005-78176 A | 3/2006 |
| JP | 3802018 B2 | 5/2006 |
| WO | WO 2007/046074 A1 | 4/2007 |

OTHER PUBLICATIONS

Japanese Office Action dated Mar. 30, 2010 issued in corresponding Japanese patent application No. 2007-140851 (with English translation).

(Continued)

*Primary Examiner* — Sanjay Cattungal
(74) *Attorney, Agent, or Firm* — Birch, Stewart, Kolasch & Birch, LLP (57) ABSTRACT

A position obtainment means obtains the positions of points in the heart of a subject that are present in at least two three-dimensional volume datasets in a group of three-dimensional volume datasets that have been obtained by imaging the heart of the subject at predetermined time intervals, the points anatomically corresponding to each other, and the at least two three-dimensional volume datasets having been obtained by imaging at different time from each other. A function information obtainment means obtains, based on each of the positions of the points in the heart, which have been obtained by the position obtainment means, function information representing the function of the heart at each point within a three-dimensional space. A display means displays, based on the function information, the motion function of the heart at each of the points in an image that has the shape of the heart of the subject.

6 Claims, 5 Drawing Sheets

OTHER PUBLICATIONS

Park et al., IEEE Transactions on Medical Imaging, vol. 15, No. 3, Jun. 1996, pp. 278-289.
Clarysse et al, Time—Evolution Analysis of Differential Features on 3D Surfaces of the Heart Walls, vol. 4, IEEE, 1995, pp. 1807-1811.
Shi at al., IEEE Transactions on Medical Imaging, vol. 19, No. 1, Jan. 2000, pp. 36-50.
Office Action dated Aug. 17, 2010 in Japanese Application No. 2007-140851.

* cited by examiner

FIG. 8A  LONG-AXIAL IMAGE CARDIAC BASE  SHORT-AXIAL IMAGE

FIG. 8B  LONG-AXIAL IMAGE CARDIAC BASE  SHORT-AXIAL IMAGE

CARDIAC FUNCTION ANALYSIS APPARATUS, METHOD AND PROGRAM

BACKGROUND OF THE INVENTION

1. Field of the Invention

The present invention relates to a cardiac function analysis apparatus and method for displaying a cardiac function. Further, the present invention relates to a computer program for the apparatus and the method.

2. Description of the Related Art

Figure 8A:
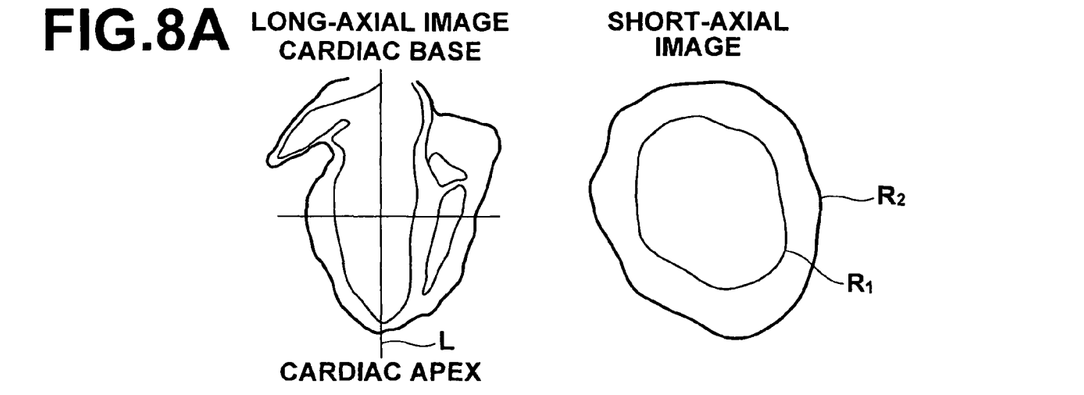
FIG. 8A is a diagram illustrating a heart in diastole.
Figure 8B:
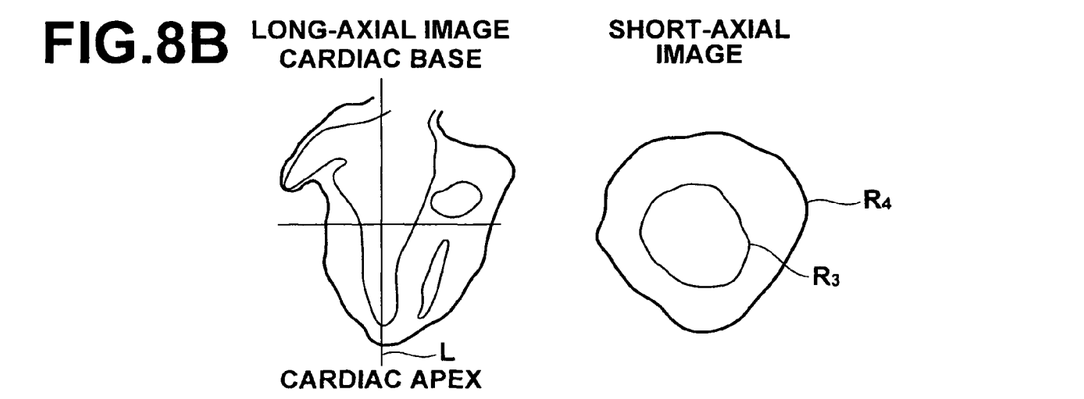
FIG. 8B is a diagram illustrating the heart in systole.
Figure 8C:
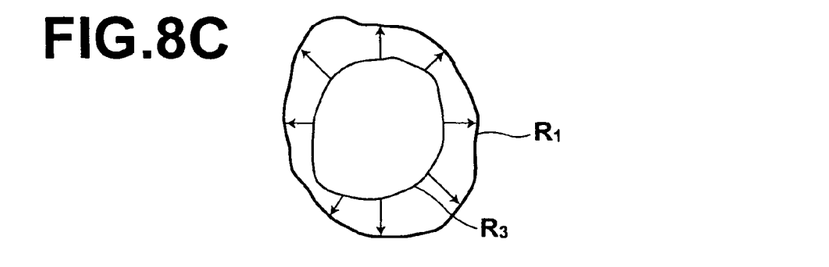
FIG. 8C is a diagram for explaining the positions of the cardiac muscle wall in diastole and in systole and the function of the heart.

Conventionally, in cardiac motion analyses using CT images obtained in a plurality of different phases (temporal phases), slice images (short-axial images) in the short-axial direction of a heart are obtained from a three-dimensional image that has been obtained in each of the phases. Then, outlines R1, R2, R3 and R4 of the cardiac muscle wall in each of the phases are extracted from the slice images at corresponding positions (please refer to FIG. 8A, which is a diagram illustrating a heart in diastole (relaxation period), and FIG. 8B, which is a diagram illustrating the heart in systole (contraction period)). Then, outlines R1 and R3 of the cardiac muscle wall (inner surface) at a cross section on a line intersecting the same position of long axis L are obtained. Further, a difference between the outlines R1 and R3 is used as an amount of the motion of the cardiac muscle wall (please refer to FIG. 8C). This processing is performed at each position of short-axial cross sections that are orthogonal to the long axis of the heart from the cardiac apex to the cardiac base. Then, the obtained result is output as a three-dimensional analysis result.

Further, as a method for displaying such a cardiac motion analysis result, a bull's-eye display method has been used. In the bull's-eye display method, when a heart is assumed to approximate an ellipsoid model, the result is displayed by concentrically arranging sliced planes that have been obtained by slicing the ellipsoid at constant intervals in a direction traversing the long axis of the ellipsoid. This display method is mainly used for function images. Further, this display method is used to display images directly obtained by cardiac muscle scintigraphy (SPECT; single photon emission computed tomography) and functions obtained from the result of analysis using CT (computed tomography) or MRI (magnetic resonance imaging) (for example, U.S. Patent Application Publication No. 20050008209).

When the aforementioned result of analysis is obtained by using the CT or MRI, the motion of the heart in a radial direction from the center of the short-axial image of the heart is observed. However, the actual motion of the heart includes rotation and twisting motion in addition to relaxation and contraction. Therefore, the aforementioned result of analysis does not reflect the function of the heart based on the actual motion of the heart.

SUMMARY OF THE INVENTION

In view of the foregoing circumstances, it is an object of the present invention to provide a cardiac function analysis apparatus and method that can accurately evaluate the cardiac function and a program for the apparatus and method.

A cardiac function analysis apparatus according to the present invention is a cardiac function analysis apparatus comprising:

a volume data storage means for storing a group of three-dimensional volume datasets that have been obtained by imaging the heart of a subject at predetermined time intervals;

a position obtainment means for obtaining the positions of points in the heart that are present in at least two three-dimensional volume datasets in the group of three-dimensional volume datasets, the points anatomically corresponding to each other, and the at least two three-dimensional volume datasets having been obtained by imaging at different time from each other;

a function information obtainment means for obtaining, based on each of the positions of the corresponding points in the heart, which have been obtained by the position obtainment means, function information representing the function of the heart at each point within a three-dimensional space; and a display means for displaying, based on the function information, which has been obtained by the function information obtainment means, the motion function of the heart at each of the points in an image that has the shape of the heart of the subject.

Further, a program according to the present invention is a program for causing a computer to function as:

a position obtainment means for obtaining the positions of points in the heart of a subject that are present in at least two three-dimensional volume datasets in a group of three-dimensional volume datasets that have been obtained by imaging the heart of the subject at predetermined time intervals, the points anatomically corresponding to each other, and the at least two three-dimensional volume datasets having been obtained by imaging at different time from each other;

a function information obtainment means for obtaining, based on each of the positions of the corresponding points in the heart, which have been obtained by the position obtainment means, function information representing the function of the heart at each point within a three-dimensional space; and a display means for displaying, based on the function information, which has been obtained by the function information obtainment means, the motion function of the heart at each of the points in an image that has the shape of the heart of the subject.

Further, a cardiac function analysis method according to the present invention is a cardiac function analysis method comprising the steps of:

obtaining the positions of points in the heart of a subject that are present in at least two three-dimensional volume datasets in a group of three-dimensional volume datasets that have been obtained by imaging the heart of the subject at predetermined time intervals, the points anatomically corresponding to each other, and the at least two three-dimensional volume datasets having been obtained by imaging at different time from each other;

obtaining, based on each of the positions of the corresponding points in the heart, which have been obtained in the position obtainment step, function information representing the function of the heart at each point within a three-dimensional space; and displaying, based on the function information, which has been obtained in the function information obtainment step, the motion function of the heart at each of the points in an image that has the shape of the heart of the subject.

The "function information representing the function of the heart" is an index for evaluating the motion function of the heart. For example, the function information is obtained from an amount of displacement when corresponding points of the heart have moved, the thickness of the cardiac wall, the diameter of the ventricle (cardiac ventricle) or the like.

The function information may represent an amount of change in the thickness of the cardiac wall of the subject or a rate of increase in the thickness of the cardiac wall of the subject based on the thickness of the cardiac muscle of the subject at each of the points.

The function information may represent a difference between the diameter of a cardiac ventricle in diastole and that of the cardiac ventricle in systole at each of the points.

Further, the function information may represent an amount of displacement between the corresponding points.

Further, the display means may optionally assign, based on the value of the function information, a different color to each point on the image that has the shape of the heart of the subject.

In the present invention, the positions of points in a heart that are present in at least two three-dimensional volume datasets that have been obtained at different time from each other, the points anatomically corresponding to each other, are obtained. Then, the function of the heart at each of at least two corresponding points is obtained. Further, the motion function of the heart, based on the motion of the heart, is displayed in an image that has the shape of the heart of the subject. Therefore, it is possible to evaluate the motion function of the heart so that the actual function of the heart, which includes rotation and twisting motion in addition to relaxation and contraction, is reflected.

Further, the function of the heart may be evaluated by obtaining an amount of displacement of corresponding points in the heart, an amount of change in the thickness of the cardiac wall or a rate of increase in the thickness of the cardiac wall, which is obtained from the thickness of the cardiac muscle, or a difference between the diameter of a cardiac ventricle in diastole and that of the cardiac ventricle in systole. Accordingly, it becomes possible to quantitatively express the motion function of the heart.

Further, when the function is displayed, if a different color is assigned, based on the value of the function information, to each point (arranged at each point) on the image that has the shape of the heart, a user can distinguish a malfunctioning region of the heart from a normal region, which is functioning well.

Note that the program of the present invention may be provided being recorded on a computer readable medium. Those who are skilled in the art would know that computer readable media are not limited to any specific type of device, and include, but are not limited to: floppy disks, CD's RAM's, ROM's, hard disks, magnetic tapes, and internet downloads, in which computer instructions can be stored and/or transmitted. Transmission of the computer instructions through a network or through wireless transmission means is also within the scope of this invention. Additionally, computer instructions include, but are not limited to: source, object and executable code, and can be in any language including higher level languages, assembly language, and machine language.

DESCRIPTION OF THE PREFERRED EMBODIMENTS

Figure 1:
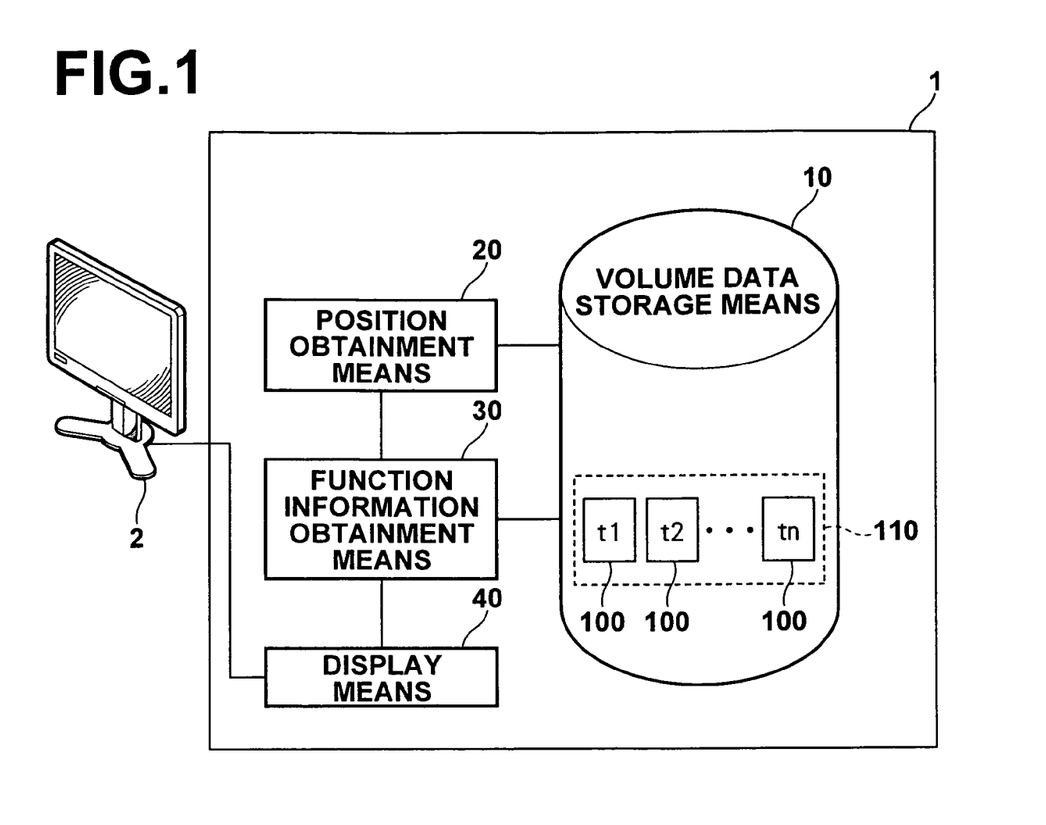
FIG. 1 is a schematic diagram illustrating the configuration of a cardiac function analysis apparatus according to the present invention.

Hereinafter, embodiments of a cardiac function analysis apparatus according to the present invention will foe described in detail with reference to the attached drawings. FIG. 1 is a schematic diagram illustrating the configuration of the cardiac function analysis apparatus according to the present invention. The configuration of a cardiac function analysis apparatus 1, as illustrated in FIG. 1, is realized by causing a computer to execute a cardiac function analysis program that has been installed in an auxiliary storage apparatus. The cardiac function analysis program is stored on a computer-readable storage medium, such as a CD-ROM (compact disc read-only memory), or distributed through a network, such as the Internet, and installed in the computer.

The cardiac function analysis apparatus 1 according to the present invention includes a volume data storage means 10, a position obtainment means 20, a function information obtainment means 30 and a display means 40. The volume data storage means 10 stores a group 110 of three-dimensional datasets, which includes a plurality of three-dimensional volume datasets 100 that have been obtained by imaging the heart of a subject at predetermined time intervals. The position obtainment means 20 obtains the positions of points in the heart that are present in at least two three-dimensional volume datasets, the points anatomically corresponding to each other. The function information obtainment means 30 obtains, based on the positions of the anatomically corresponding points in the heart, that are present in at least two three-dimensional volume datasets, function information representing the function of the heart at each point within a three-dimensional space. The display means 40 displays, based on the function information, the motion function of the heart at each of the points in an image that has the shape of the heart of the subject.

The three-dimensional volume dataset 100 is obtained by superposing, one on another, two-dimensional slice image datasets that are sequentially obtained along a direction perpendicular to the slice planes of a diagnosis target, such as a heart. The three-dimensional volume dataset 100 is generated by superposing, one on another, a plurality of tomographic images obtained by a CT apparatus, a MRI apparatus or the like. For example, a volume dataset Obtained by using the CT apparatus includes a dataset storing an absorption amount of X-rays for each voxel and a specific voxel value (if the dataset is obtained by imaging by the CT apparatus, a value representing an absorption amount of X-rays) is given to each voxel.

The group 110 of three-dimensional volume datasets includes a plurality of three-dimensional volume datasets 100. For example, a subject is imaged at constant time intervals $\Delta t$ and a series of three-dimensional volume datasets 100 are obtained by imaging at time t1, t2, ..., tn.

The volume data storage means 10 is a high-capacity storage apparatus, such as a hard disk. The group 100 of three-dimensional volume datasets is stored in the volume data storage means 10.

The position obtainment means 20 obtains the positions of points in the heart that are present in at least two three-dimensional volume datasets 100 that have been obtained by imaging at different time, the points anatomically corresponding to each other between the at least two three-dimensional volume datasets 100.

Specifically, position-matching (positioning or registration) is performed between two three-dimensional volume datasets 100 that have been obtained in different phases, namely at time t and at time t+Δt. Position-matching is performed in such a manner that the voxel value of the three-dimensional volume dataset in one phase (at time t) and that of the three-dimensional volume dataset in the other phase (at time t+Δt) become the same. Accordingly, the positions of points in the heart that anatomically correspond to each other are obtained. Further, as time passes, position-matching is sequentially performed between, at least two three-dimensional volume datasets that have been obtained in different phases. Accordingly, it is possible to obtain the positions of the anatomically corresponding points in the heart at least in two different phases.

Figure 2A:
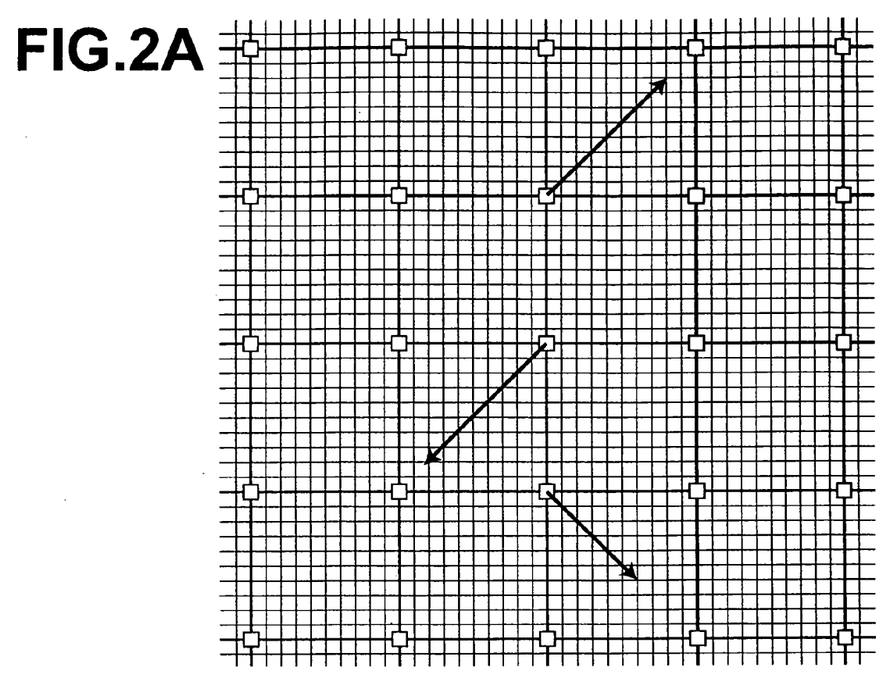
FIG. 2A is a diagram (No. 1) for explaining a method for transforming a three-dimensional space.
Figure 2B:
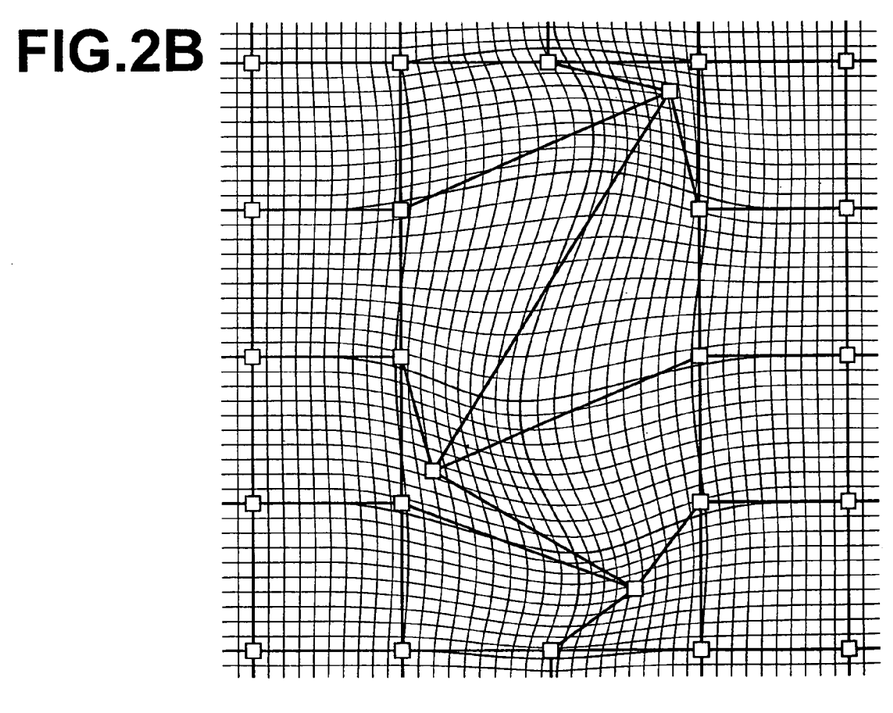
FIG. 2B is a diagram (No. 2) for explaining a method for transforming a three-dimensional space.
Figure 3:
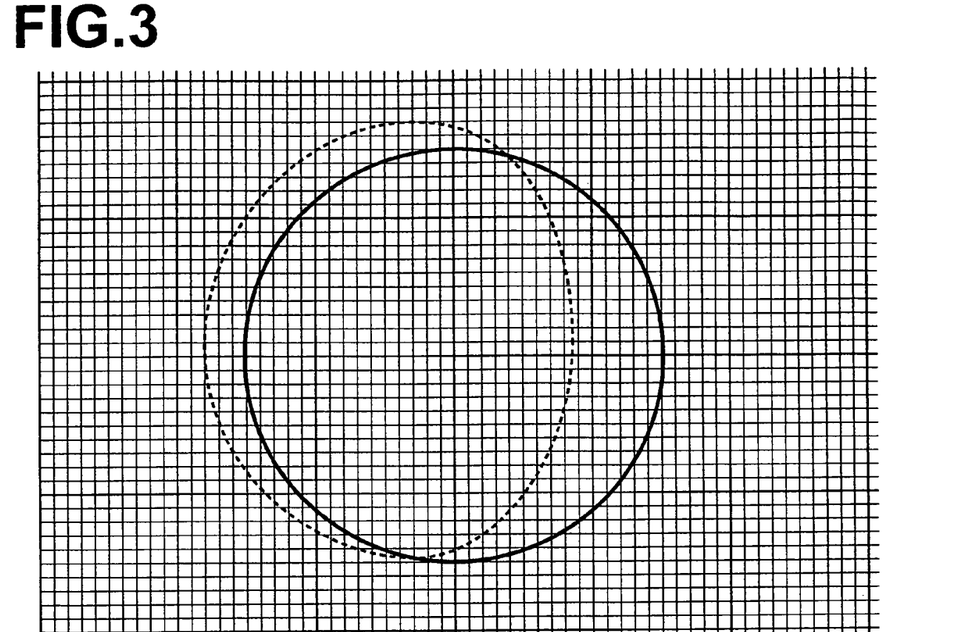
FIG. 3 is a diagram (No. 1) for explaining position-matching.
Figure 4:
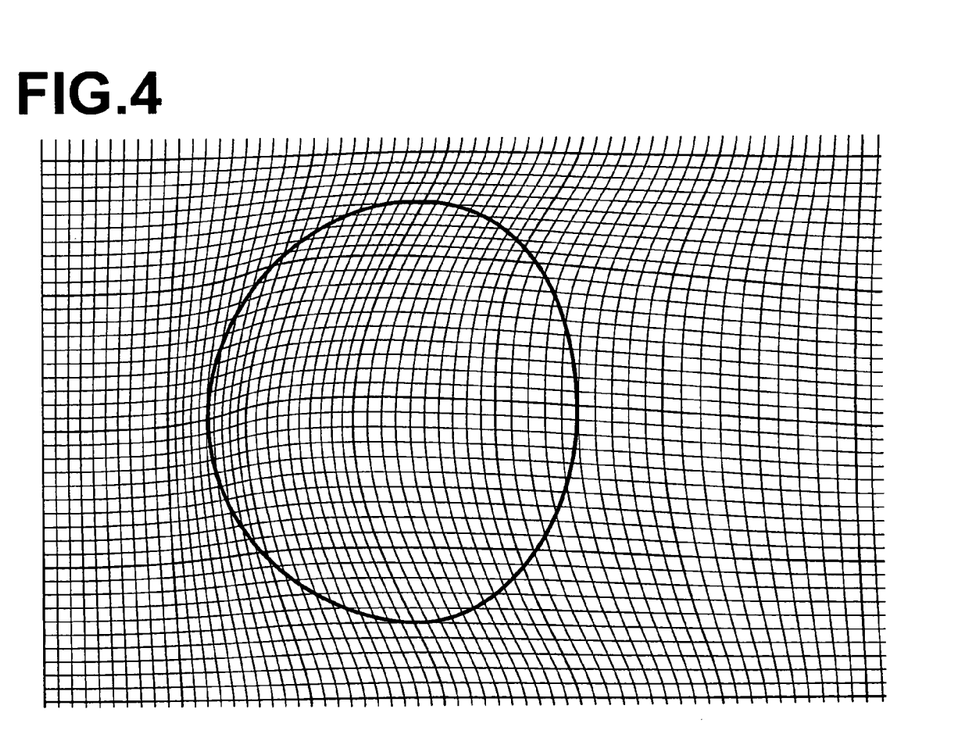
FIG. 4 is a diagram (No. 2) for explaining position-matching.

Position-matching may be performed, for example, by using a position-matching method, in which an image within a three-dimensional space is transformed by transforming the three-dimensional space. First, as illustrated in FIG. 2A, B-spline control points (squares in FIG. 2A) are arranged in three-dimensional grid format constant intervals (distances) within the three-dimensional space. Then, the control points are moved in the directions of arrows. Consequently, the three-dimensional space is transformed, as illustrated in FIG. 2B. Further, the three-dimensional space is transformed so that the shape (solid line) of the heart at time t and the shape (broken line) of the heart at time t+Δt, as illustrated in FIG. 3, become the same (please refer to FIG. 4). Specifically, position-matching is performed by searching for positions that are most similar to each other by using a SID (squared intensity difference) method or a cc (correlation coefficient) method. In the SID method, positions at which the square of a difference between two images becomes small are obtained. In the CC method, positions at which a correlation coefficient becomes high are obtained. It is possible to obtain, based on the result of position-matching, the positions of points in the heart that anatomically correspond to each other. Here, a case, in which the three-dimensional space is transformed by moving the B-spline control points, has been explained. However, the three-dimensional space may be transformed by describing the space by using another interpolation formula.

The function information obtainment means 30 obtains, based on the position of each of anatomically corresponding points in the heart, function information representing the function of the heart by using at least two three-dimensional volume datasets 100. The motion function of the heart is evaluated based on the motion of the heart, which repeats relaxation and contraction. However, the actual motion of the heart includes rotation and twisting motion in addition to motion in a radial direction from the center of the heart. The function of the heart can be evaluated based on an amount of displacement of corresponding points in the heart, an inner diameter of a cardiac ventricle, the thickness of a cardiac muscle or the like. Therefore, the function information is obtained from the amount of displacement of corresponding points in the heart in different phases, the inner diameter of the cardiac ventricle or the thickness of the cardiac muscle.

Specifically, as the function information, an amount of displacement of corresponding points in a cardiac wall, an amount of change in the thickness of the wall, a rate of increase in the thickness of the wall, an amount of motion of the wall and the like are obtained. The amount of change in the thickness of the wall is represented by a difference between the thickness of the cardiac muscle in diastole and that of the cardiac muscle in systole. The rate of increase in the thickness of the wall is a value of B−A/A, where value A is the thickness of the cardiac muscle in diastole and B is the thickness of the cardiac muscle in systole. The amount of motion of the wall is a difference between the diameter of the cardiac ventricle in diastole and that of the cardiac ventricle in systole.

Figure 5:
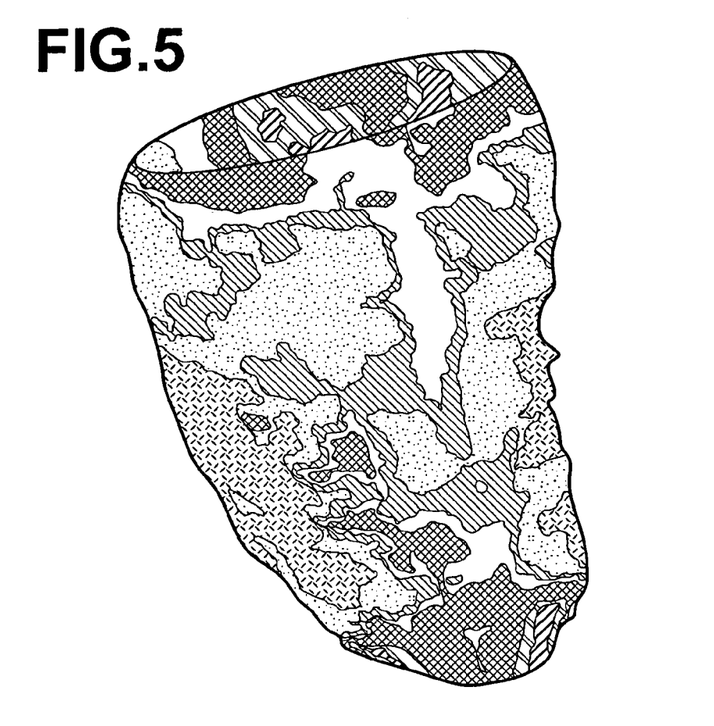
FIG. 5 is a diagram illustrating an example of an image in which colors corresponding to function information are arranged in an image that has the shape of a heart.

The display means 40 displays, based on the function information, the cardiac function at each point of the heart in an image that has the shape of the heart. Specifically, color components r, g and b are assigned to each of points in the cardiac wall in such a manner that the color components r, g and b correspond to the sizes of components x, y and z of a three-dimensional vector representing displacement of the respective points. Accordingly, a color corresponding to the value of function information about each point is arranged and the direction, of the motion of the cardiac wall is visualized (Please refer to FIG. 5. In FIG. 5, hatching is used to represent a different color.). Further, cardiac function with respect to other kinds of function information can be visualized by arranging a color corresponding to the value of the function information about each point in the cardiac wall. If colors based on the function are arranged on the shape of the heart, it is possible to immediately recognize the level of, functioning (performance) of the heart at each point. Further, the cardiac function may be displayed by changing textures instead of the colors. Further, numerical values representing function information may be displayed at each of corresponding positions in the heart.

Figure 6:
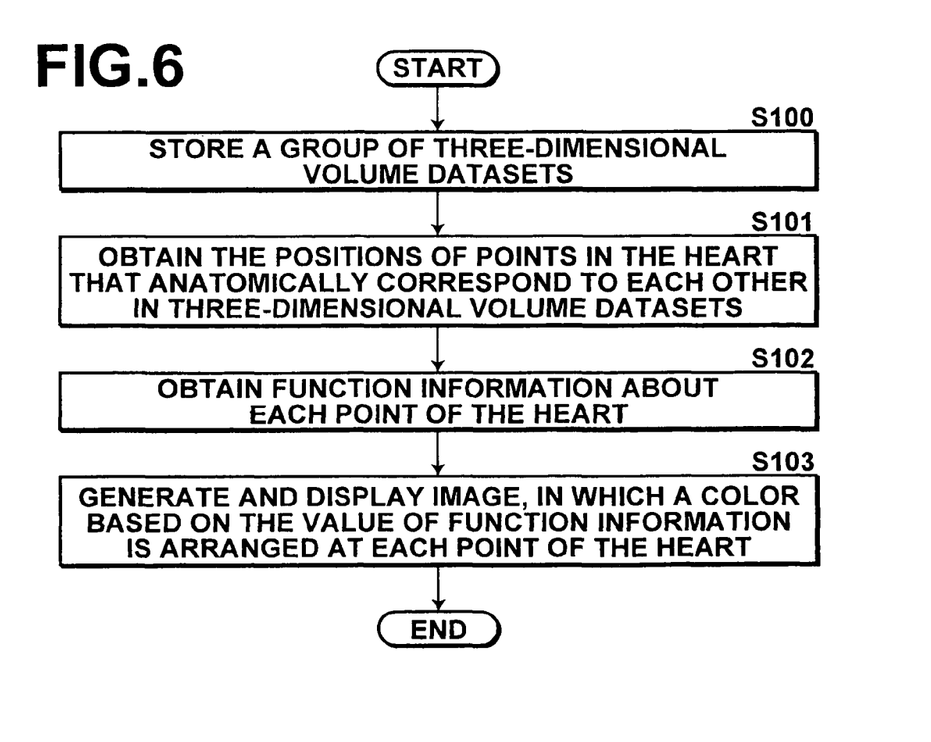
FIG. 6 is a flowchart for explaining the flow of processing by the cardiac function analysis apparatus.

Next, the flow of processing for generating an image representing cardiac function by using the cardiac function analysis apparatus according to the present invention will be described with reference to the flowchart illustrated in FIG. 6.

A group 110 of three-dimensional volume datasets that have been obtained by imaging a subject, which is a diagnosis target, at time intervals Δt by using a CT apparatus or the like is stored in a hard disk (storage means 10) (step S100).

Figure 7:
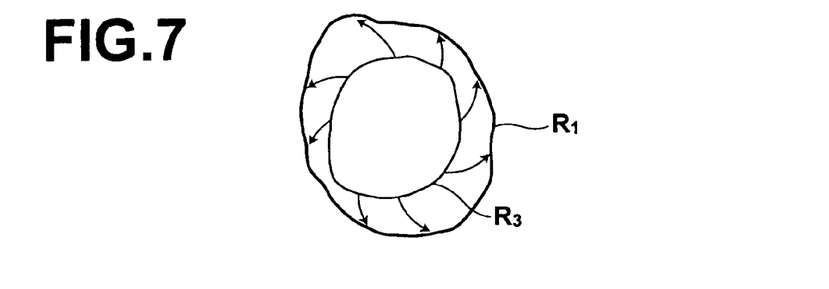
FIG. 7 is a diagram illustrating the movement of the positions of points that anatomically correspond to each other.

Next, the position obtainment means 20 obtains the positions of points in the heart, the points anatomically corresponding to each other and being present in each of three-dimensional volume datasets in the group 110 of three-dimensional volume datasets (step S101). The motion of the heart includes, twisting motion because of the presence of diastole and systole. Therefore, each of the points in the heart that anatomically corresponding to each other are situated at twisted positions, as illustrated in FIG. 7.

Therefore, the function information obtainment means 30 obtains an amount of displacement of corresponding points, an amount of change in the thickness of the cardiac wall, a rate of increase in the thickness of the cardiac wall, an amount of motion of the cardiac wall or the like, as function information. These kinds of function information are obtained based on the positions of points in the heart that anatomically correspond to each other, the thickness of the cardiac muscle or the diameter of the cardiac ventricle in at least two three-dimensional volume datasets (step S102). The display means 40 displays an image in which a color corresponding to the value of function information that has been obtained by the function information obtainment means 30 is arranged at each position on the shape of the heart (step S103).

As described above in detail, it becomes possible to display cardiac motion function that has been evaluated so as to reflect the actual motion of the heart, which includes rotation and twisting motion in addition to relaxation and contraction.

What is claimed is:

1. A cardiac function analysis apparatus comprising:
   a volume data storage means for storing a group of three-dimensional volume datasets that have been obtained by imaging the heart of a subject at predetermined time intervals;
   a position obtainment means for obtaining the positions of points in the heart that are present in at least two three-dimensional volume datasets in the group of three-dimensional volume datasets, the points anatomically corresponding to each other, and the at least two three-dimensional volume datasets having been obtained by imaging at different time from each other;
   a function information obtainment means for obtaining, based on each of the positions of the corresponding points in the heart, which have been obtained by the position obtainment means, three dimensional displacement vectors that represent displacements of the heart among the corresponding points as function information representing the function of the heart at each point within a three-dimensional space; and
   a display means for assigning colors that respectively represent the direction of the three dimensional displacement vectors to each point of the heart based on the function information, which has been obtained by the function information obtainment means, and displaying the colors assigned to each point at the positions of each of the points in an image that has the shape of the heart of the subject.

2. A cardiac function analysis apparatus, as defined in claim 1, wherein the function information represents an amount of change in the thickness of the cardiac wall of the subject or a rate of increase in the thickness of the cardiac wall of the subject based on the thickness of the cardiac muscle of the subject at each of the points.

3. A cardiac function analysis apparatus, as defined in claim 1, wherein the function information represents a difference between the diameter of a cardiac ventricle in diastole and that of the cardiac ventricle in systole at each of the points.

4. A cardiac function analysis apparatus as defined in claim 1, wherein:
   the display means assigns color components corresponding to the sizes of x, y, and z components of the displacement vectors as the colors that represent the directions of the displacement vectors.

5. A non-transitory computer readable medium having a program for causing a computer to function as:
   a position obtainment means for obtaining the positions of points in the heart of a subject that are present in at least two three-dimensional volume datasets in a group of three-dimensional volume datasets that have been obtained by imaging the heart of the subject at predetermined time intervals, the points anatomically corresponding to each other, and the at least two three-dimensional volume datasets having been obtained by imaging at different time from each other;
   a function information obtainment means for obtaining, based on each of the positions of the corresponding points in the heart, which have been obtained by the position obtainment means, three dimensional displacement vectors that represent displacements of the heart among the corresponding points as function information representing the function of the heart at each point within a three-dimensional space; and
   a display means for assigning colors that respectively represent the direction of the three dimensional displacement vectors to each point of the heart based on the function information, which has been obtained by the function information obtainment means, and displaying the colors assigned to each point at the positions of each of the points in an image that has the shape of the heart of the subject.

6. A cardiac function analysis method comprising the steps of:
   obtaining the positions of points in the heart of a subject that are present in at least two three-dimensional volume datasets in a group of three-dimensional volume datasets that have been obtained by imaging the heart of the subject at predetermined time intervals, the points anatomically corresponding to each other, and the at least two three-dimensional volume datasets having been obtained by imaging at different time from each other;
   obtaining, based on each of the positions of the corresponding points in the heart, which have been obtained in the position obtainment step, three dimensional displacement vectors that represent displacements of the heart among the corresponding points as function information representing the function of the heart at each point within a three-dimensional space; and
   assigning colors that respectively represent the direction of the three dimensional displacement vectors to each point of the heart based on the function information, which has been obtained in the function information obtainment step; and displaying the colors assigned to each point at the positions of each of the points in an image that has the shape of the heart of the subject.

* * * * *